Jan. 2, 1968   B. A. WHITEMAN   3,361,296
CORE ORIENTING AND FEEDING APPARATUS
Filed Oct. 18, 1965   3 Sheets-Sheet 1

INVENTOR.
BENTON A. WHITEMAN
BY Glenn, Palmer
& Matthews
HIS ATTORNEYS

INVENTOR.
BENTON A. WHITEMAN

BY Glenn, Palmer
& Matthews

HIS ATTORNEYS

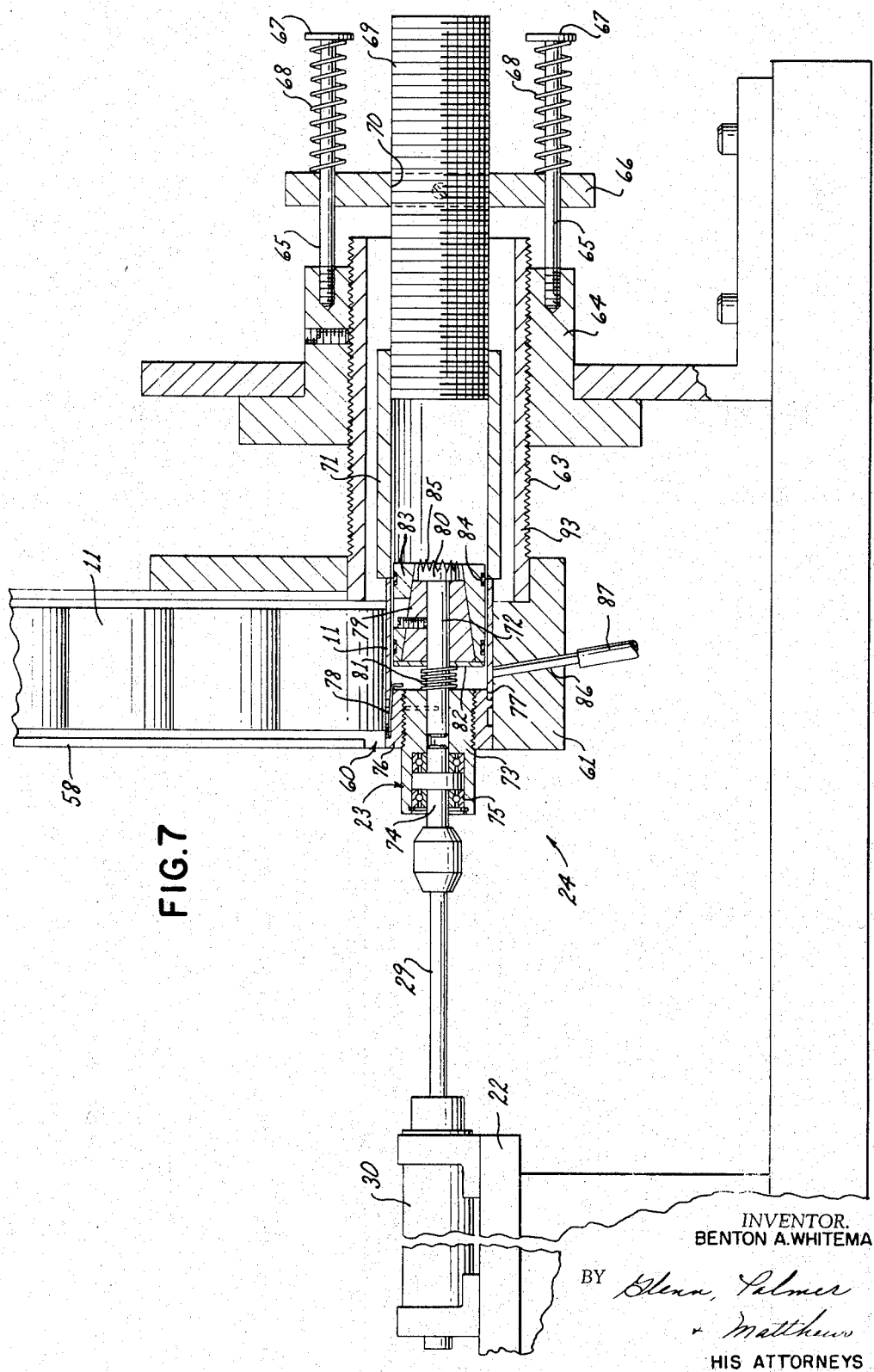

United States Patent Office

3,361,296
Patented Jan. 2, 1968

3,361,296
CORE ORIENTING AND FEEDING APPARATUS
Benton A. Whiteman, Richmond, Va., assignor to Reynolds Metals Company, Richmond, Va., a corporation of Delaware
Filed Oct. 18, 1965, Ser. No. 497,073
8 Claims. (Cl. 221—175)

ABSTRACT OF THE DISCLOSURE

This disclosure relates to an apparatus for serially winding a strip of metallic foil onto hollow cylindrical cores to form strip conductor coils, the cores being serially fed from a receptacle containing a supply thereof through a rotating sleeve that orients the cores passing therethrough, into a proper position for being serially received in a chute having an outlet through which a mandrel can project to pick up a core and then be indexed into a proper position relative to the apparatus to have the respective core rotated by a drive shaft of the apparatus that rotates the core carrying part of the mandrel and, thereby, wind the metallic foil strip thereon.

---

This invention relates to an improved apparatus for feeding unoriented members to a desired location with the members being oriented before they reach the desired location as well as to an improved method for feeding such members or the like.

It is well known that many apparatus require work pieces or the like to be fed thereto in a serial manner for the proper operation of the apparatus. However, such work pieces or members are normally contained in a large hopper means in unoriented condition whereby complicated mechanism and the like is required to properly orient such members as the same leave the hopper means and are directed to the apparatus, such prior known complicated mechanism usually requiring a long shut down period for the apparatus when a jam situation exists in the feeding means.

According to the teachings of this invention, however, improved feeding means are provided wherein unoriented work pieces or members can be fed into the apparatus of this invention and be properly oriented at the desired location in a relatively simple manner and with relatively inexpensive structure.

In particular, the mechanism in this invention includes a rotating sleeve so constructed and arranged in a manner hereinafter set forth that the work pieces or members can enter one end of the rotating sleeve in unoriented condition and will leave the other end of the rotating sleeve in oriented condition, the members being properly oriented as they pass through the rotating sleeve.

For example, in one embodiment of this invention, a strip conductor coil winding apparatus is provided wherein a strip of conductive material or the like is adapted to be coiled onto substantially cylindrical hollow cardboard cores or the like, the cardboard cores being contained in unoriented condition in a suitable receptacle means or the like to be serially dispensed in unoriented condition at one end of the aforementioned rotating sleeve so that as the cores serially leave the other end of the sleeve, the rotating sleeve properly orients the cores so that the axis of rotation of each core is disposed parallel to the longitudinal axis of the rotating sleeve. In this manner, the oriented cores can be dispensed from the outlet end of the rotating sleeve into a chute means whereby the aligned and oriented cores in the chute means can be serially utilized in the coil winding apparatus in a manner hereinafter set forth.

Accordingly, it is an object of this invention to provide an improved work piece feeding mechanism or the like, the mechanism of this invention having one or more of the novel features set forth above or hereinafter shown or described.

Another object of this invention is to provide an improved method for feeding work pieces or the like, the method of this invention having one or more of the novel features set forth above or hereinafter shown or described.

A further object of this invention is to provide an improved strip conductor coil winding apparatus or the like.

Another object of this invention is to provide an improved method for winding strip conductor coils or the like.

Other objects, uses and advantages of this invention are apparent from a reading of this description which proceeds with reference to the accompanying drawings forming a part thereof and wherein.

FIGURE 7 is an enlarged, fragmentary, cross-sectional view illustrating the lower part of the structure of FIGURE 4.

Figure 1:
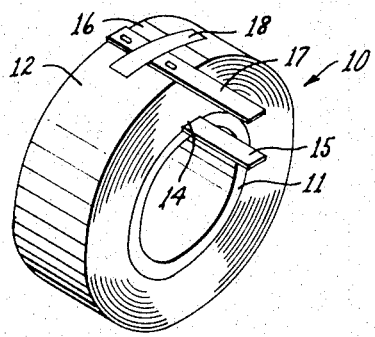
FIGURE 1 is a perspective view of a strip conductor coil formed according to the teachings of this invention.

While the various features of this invention are hereinafter described and illustrated as being particularly adaptable for providing means for feeding hollow cylindrical cores for a strip conductor coil winding apparatus or the like, it is to be understood that the features of this invention can be utilized singly or in any combination thereof to provide feeding means for other devices as desired.

Therefore, this invention is not to be limited to only the embodiment illustrated in the drawings, because the drawings are merely utilized to illustrate one of the wide variety of uses of this invention.

Referring now to FIGURE 1, a strip conductor coil formed according to the teachings of this invention is generally indicated by the reference numeral 10 and comprises a hollow cylindrical core 11 formed of cardboard or the like and on which is coiled a strip 12 of conductive material, such as aluminum-containing metallic foil or the like. If desired, each convolution of the strip of conductive material 12 can be interleaved with a strip of insulating material 13, FIGURE 3, if desired.

The strip of conductive material 12 of the coil 10 of FIGURE 1 has the inner end 14 thereof secured to an inner terminal lead 15 while the outer end 16 of the strip 12 is interconnected to an outer terminal lead 17, the outer end 16 of the strip of conductive material 12 being held in its coiled relation by a suitable strip of adhesive 18 or the like.

Figure 3:
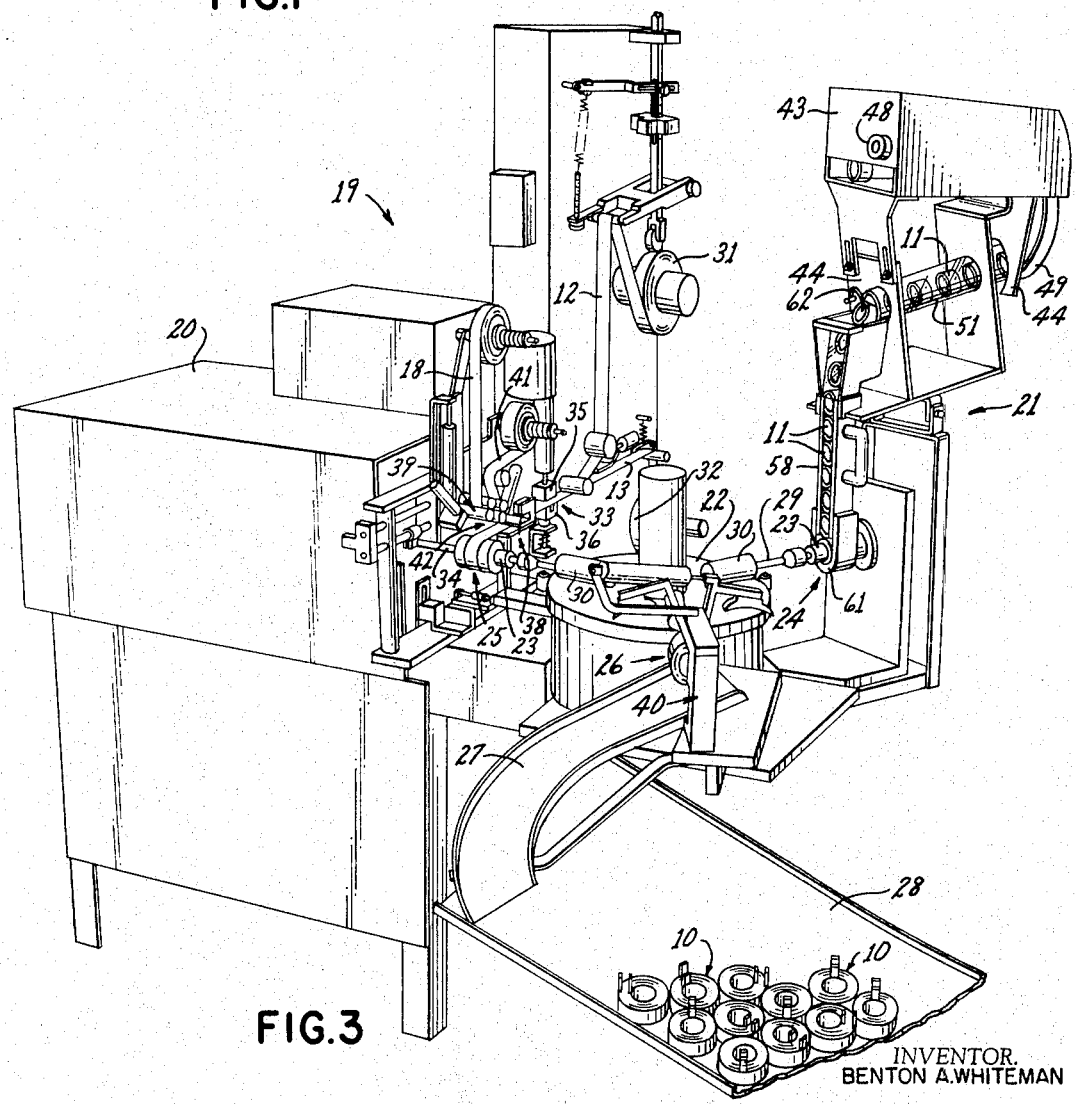
FIGURE 3 is a perspective view illustrating the improved apparatus of this invention for forming the coils of FIGURE 1.

The apparatus of this invention for continuously making strip conductor coils 10 is generally indicated by the reference numeral 19 in FIGURE 3 and comprises a frame means 20 carrying the improved hopper means 21 of this invention for serially feeding the cores 11 to the apparatus 19 as needed thereby.

While the general structure and operation of the apparatus 19 of this invention is fully disclosed and claimed in the co-pending patent application, Ser. No. 366,497, filed May 11, 1964, sufficient description of the structure and operation of the apparatus 19 will be hereinafter set forth to fully illustrate the importance of the improved hopper means 21 of this invention.

In particular, the appaartus 19 includes a rotatable and indexible table 22 carrying a plurality of mandrels 23 movable between three stations 24, 25 and 26 of the apparatus 19, each mandrel 23 at the station 24 receiving a core 11 from the hopper means 21 in a manner hereinafter described while at the station 25 causing the strips 12 and 13 to be wound on the core 11 thereof to form a strip conductor coil 10 so that the same can be ejected from the apparatus 19 at the station 26 to pass down a chute 27 to a table 28 for subsequent testing and packaging thereof.

Each mandrel 23 is carried on a piston rod 29 extended and retracted by a hydraulic or pneumatic cylinder means 30 carried by the table 22.

The strip of conductive material 12 is fed from a free wheeling supply roll 31 carried by the frame means 20 while the insulating strip material 13, if utilized, is fed from a free wheeling supply roll 32 also carried by the frame means 20. The strips of material 12 and 13 are fed through the apparatus 19 from the supply rolls 31 and 32 through a lead attaching station 33 to the station 25 whereby the ends of the strips of material 12 and 13 are adapted to be fastened by tape means to a core 11 carried by a mandrel 23 at the station 25.

With the mandrel 23 at the station 25, thme mandrel 23 is extended outwardly by its respective cylinder 30 so that the core carrying mandrel 23 is interconnected to a rotatable drive shaft 34 whereby rotation of the drive shaft 34 causes rotation of the mandrel 23 and, thus, the core 11 thereon whereby the strips of material 12 and 13 are coiled thereon.

Figure 2:
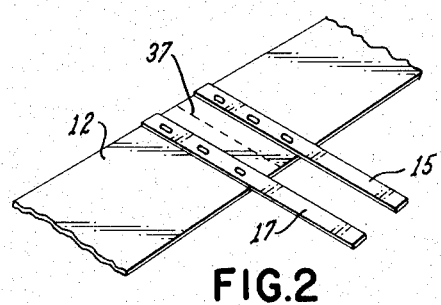
FIGURE 2 is a fragmentary perspective view illustrating terminal leads attached to a strip of conductive material utilized to form the coil of FIGURE 1.

Just before the desired lengths of the material 12 and 13 have been wound on the core 11 at the station 25 to form the strip conductor coil 10, the winding operation is momentarily terminated and a pair of die locks 35 and 36 cold weld a pair of leads 17 and 15 in side by side relation on the strip of conductive material 12 in the manner illustrated in FIGURE 2 while at the same time perforating the strips 12 and 13 between the leads 17 and 15 in the manner indicated by the reference numeral 37 in FIGURE 2.

After the leads 17 and 15 have been cold welded to the strip of material 12 in the manner illustrated in FIGURE 2, the strips of material 12 and 13 are advanced to the left in FIGURE 3 by momentarily rotating the drive shaft 34 until the leads 17 and 15 are at a station 38 whereby the apparatus 19 breaks the strips of material 12 and 13 between the leads 17 and 15 at the separation means 37 so that the lead 17 can be further wound on the core 11 at the station 25 to complete the strip conductor coil 10 and be fastened thereto by the tape means 18 fed from a suitable taping head 39 in the manner set forth in the aforementioned co-pending patent application.

After the particular strip conductor coil 10 has been formed at the station 25, the particular mandrel 23 at the station 25 is retracted by its cylinder means 30 so that the table 22 can be indexed in a counterclockwise direction to position the strip conductor coil carrying mandrel 23 at the station 26 while the other retracted mandrels 23 are respectively indexed to the stations 24 and 25. In the new indexed position of the table 22, the mandrels 23 are extended whereby the mandrel 23 at the station 24 receives a core 11 from hopper means 21 in a manner hereinafter described, the mandrel 23 at the station 25 is interconnected to the driveshaft 34 while the mandrel 23 at the station 26 is extended into the coil ejecting mechanism 40.

The new core 11 at the station 25 is interconnected to the foreward end of the strips 12 and 13 at the station 38 by tape means 41 being applied to the ends of the strips 12 and 13 at the station 38 by a taping head 42 with the taping head 42 extending the tape over to the core 11 on the mandrel 23 at the station 25. In this manner, when the operating shaft 34 is subsequently rotated to rotate the mandrel 23 at the station 25, the interconnecting tape permits the strips of material 12 and 13 to subsequently be wound onto the core 11 and be drawn from the free wheeling supply rolls 31 and 32 in the manner previously described to form a new strip conductor coil 10 in the manner previously described.

Thus, it can be seen that the apparatus 19 of this invention is adapted to continuously form the strip conductor coils 10 from the strips of material 12 and 13 in the manner set forth in the aforementioned co-pending patent application while the hopper means 21 of this invention is adapted to serially place the cores 11 at the station 24 to be picked up by the mandrels 23 in a manner now to be described.

Figure 4:
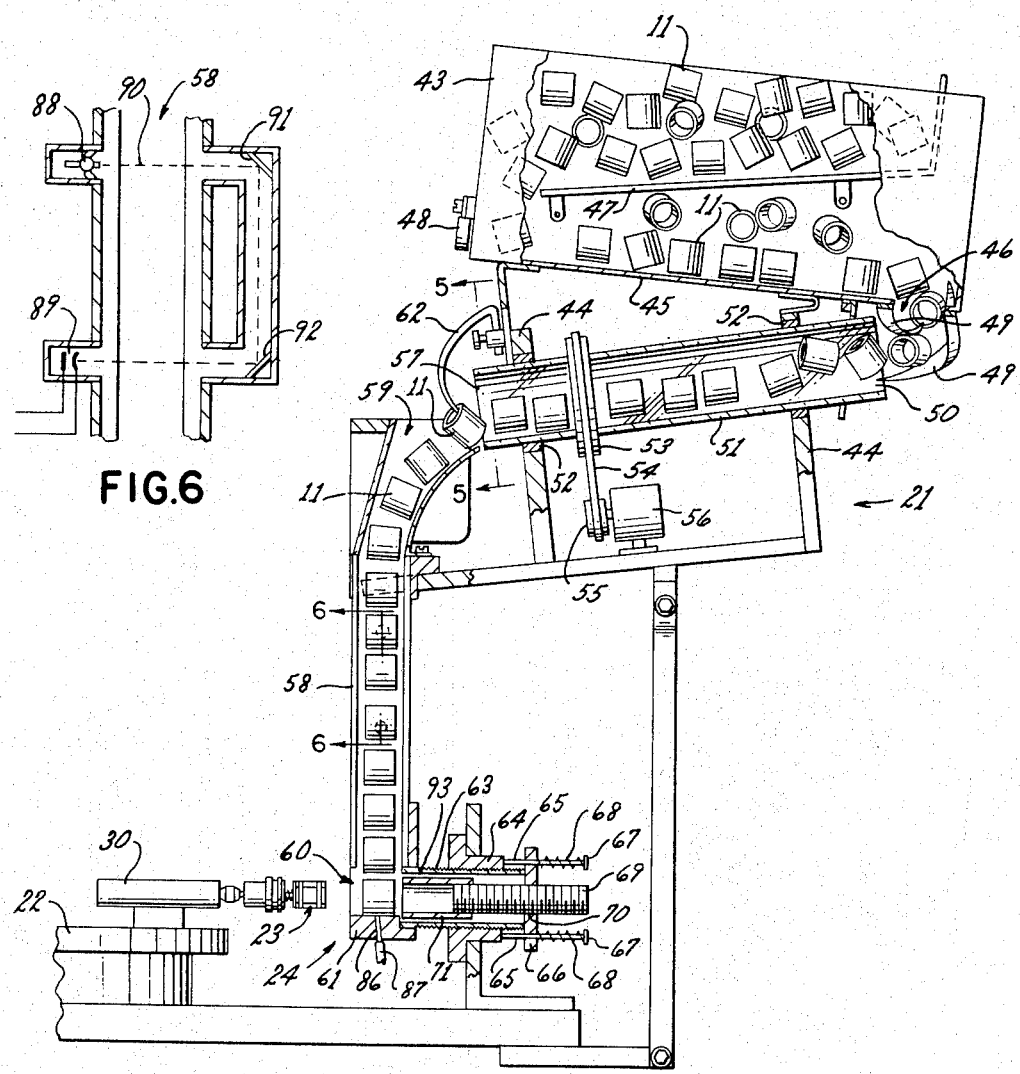
FIGURE 4 is an enlarged, fragmentary, partial, cross-sectional view of part of the apparatus of FIGURE 3.

As illustrated in FIGURES 3 and 4, the hopper means 21 includes an open top receptacle means 43 carried by bracket means 44 secured to the frame means 20 of the apparatus 19. The receptacle means 43 has a bottom wall 45 provided with an opening 46 at the rear thereof, the receptacle means 43 being adjustably mounted to the bracket means 44 to permit the angle of inclination of the bottom wall 45 to be adjusted to the desired degree relative to the horizontal for a purpose hereinafter described. An angularly disposed baffle means or wall 47 is disposed in the receptacle means 43 in the manner illustrated in FIGURE 4.

A suitable vibrator 48 is operatively interconnected to the receptacle means 43 so that when the vibrator 48 is operated, the same vibrates the receptacle means 43 so that the supply of cores 11 disposed in the receptacle means 43 will move down the baffle means 47 from right to left to fall onto the bottom wall 45 and move from left to right down the bottom wall 45 to the opening 46.

A plurality of baffle means or guides 49 are carried by the receptacle means 43 and are disposed adjacent the opening 46 thereof to tend to serially direct the cores 11 into the open end 50 of a hollow cylindrical sleeve 51 rotatably mounted to the bracket means 44 and disposed at an angle relative to the horizontal.

The sleeve 51 can be rotatably mounted in suitable bearing means 52 in the bracket means 44 and carries a suitable pulley 53 driven by a belt means 54 passing around a pulley 55 of a suitable motor 56. The motor 56 can be a variable speed motor whereby the speed of rotation of the sleeve 51 can be regulated for a purpose hereinafter described.

Rotation of the sleeve 51 causes the cores 11 entering the upper end 50 thereof in any unoriented position to become oriented with the core axes being disposed parallel with the longitudinal and rotational axis of the sleeve 51 before the cores 11 leave the lower end 57 of the sleeve 51.

A substantially vertically disposed chute means 58 is provided and is carried by the bracket means 44, the chute 58 having an upper open end 59 disposed adjacent the lower end 57 of the sleeve 51 and having a dispensing opening 60 at the lower end thereof adjacent a bottom wall means 61 of the chute means 58.

As each oriented core 11 leaves the end 57 of the rotating sleeve 51, a prong or element 62 carried by the bracket means 44 causes the core 11 to be tilted in the manner illustrated in FIGURES 4 and 5 to properly enter the chute means 58 in aligned relation whereby the axis of the cores 11 in the chute 58 will be disposed parallel with the axial axis of the mandrel means 23 at the station 24 for a purpose hereinafter described.

A hollow tubular member 93 is carried by the chute means 58 and is aligned with the dispensing opening 60 thereof, the cylindrical member 93 being externally threaded at 63 and threadedly receiving a collar 64. A plurality of pins 65 extend rearwardly of the collar 64 and are carried thereby. A plate 66 is telescoped on the pins 65 to the left of enlarged heads 67 thereof whereby suitable compression springs 68 tend to urge the plate 66 to the position illustrated in FIGURE 4 against the end of the tubular member 93.

The plate 66 threadedly receives a threaded member 69 in a threaded bore 70 thereof whereby the threaded member 69 can be adjusted relative to the plate 66, the threaded member 69 threadedly carrying a hollow cylindrical backup member 71 on the left hand end thereof.

Further, the various parts of the hopper means 21 can be made of transparent material, as illustrated, so that the entire working operation of the hopper means 21 can be readily viewable so as to detect any jamming thereof, defective part or core 11 so that such malfunction can be readily corrected even though the apparatus 19 is continuously operating. In this manner, the working operation hopper means 21 can be corrected without disrupting the continuous operation of the apparatus 19.

While the mandrel means 23 previously described for the apparatus 19 can be of any suitable construction, the embodiment thereof illustrated in FIGURE 7 comprises a shaft 72 fixed to a collar 73 rotatably mounted on the end 74 of the piston rod 29 by suitable bearing means 75. The collar 73 threadedly receives an internally threaded sleeve 76 having an annular recess 77 at the right end thereof substantially corresponding to the internal diameter of a core 11. The sleeve 76 also carries one or more leaf springs 78 normally tending to move outwardly whereby when the right hand end of the sleeve 76 is received within a core 11, the force of the leaf spring 78 tends to hold the same in the position illustrated in FIGURE 7.

The shaft 72 of the particular mandrel 23 also carries an axially movable truncated conical member 79 normally urged against an enlarged end 80 of the shaft 72 by a compression spring 81 disposed between the retainer 73 and an axially movable plate 82. A plurality of axially movable segments 83 are disposed around the conical member 79 and are held thereto by a plurality of annular resilient members 84.

After a particular mandrel 23 of the apparatus 19 has picked up a core 11 from the hopper means 21 in a manner hereinafter described and carries the same to the station 25 whereby the leaf spring 78 thereof maintains the core 11 on the mandrel means 23 in the manner illustrated in FIGURE 7 during such movement of the mandrel means 23, the particular piston rod 29 is extended at the station 25 whereby teeth 85 on the shaft 72 are engaged with mating teeth on the output shaft 34 to inerconnect the mandrel means 23 to the shaft 34 so that the mandrel means 23 can be rotated during the previously described winding operation. However, as the particular mandrel 23 is being coupled to the driveshaft 34, suitable mechanism on the driveshaft 34 pushes the segments 83 toward the retainer 73 in opposition to the force of the compression spring 81 whereby the segments 83 are cammed radially outwardly by the conical surface of the member 79 so that the segments 83 are urged into frictional engagement with the internal peripheral surface of the core 11 thereof to positively hold the core 11 in fixed position on the mandrel 23. In this manner, the core 11 will rotate in unison with the mandrel 23 during the previously described winding operation.

Since the general operation of the coil winding apparatus 19 has now been described, a more detailed description of the operation of the hopper means 21 will now be set forth.

In particular, a suitable supply of cores 11 are placed in the open top of the receptacle means 43 in any unoriented condition. When the vibrator 48 and motor 56 are turned on, the hopper means 43 is vibrated so that the cores 11 will move by gravity to the opening 46 thereof and be serially dispensed by gravity and the baffle means 49 into the upper end 50 of the rotating sleeve 51. It has been found that regardless of the position of the particular core 11 entering the upper end 50 of the rotating sleeve 51, the rotating sleeve 51 causes the particular core 11 to have its axis aligned with the axis of the rotating sleeve 51 before that particular core 11 leaves the lower open end 57 thereof.

Figure 5:
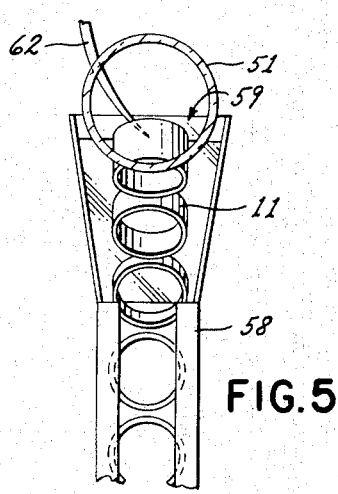
FIGURE 5 is an enlarged, fragmentary, cross-sectional view taken on line 5—5 of FIGURE 4.

As the oriented cores 11 serially leave the rotating sleeve 51, the same are tilted by the prong 62 in a manner to cause the same to fall into the upper end 59 of the chute means 58 in the manner illustrated in FIGURES 4 and 5 so that the axis of the cores 11 in the chute 58 will be coaxially aligned with the mandrel 23 at the station 24 when each core 11 reaches the dispensing opening 60 of the chute means 58.

When a mandrel 23 is disposed at the station 24 and is extended by its respective cylinder means 30, the mandrel 23 is telescoped into the core 11 at the dispensing opening 60 of the chute means 58 and is moved to the right in the manner illustrated in FIGURE 7 against the backup member 71 and carries the same to the right in opposition to the force of the compression springs 68. In this manner, the force of the compression springs 68 cause the core 11 to be fully telescoped onto the mandrel means 23 to be held thereto by the leaf spring means 78 in the manner previously described.

Thereafter, the extended mandrel 23 at the station 24 is retracted to withdraw the telescoped core 11 from the dispensing opening 60 of the chute means 58 so that the core can be advanced to the station 25 of the apparatus 19 to have the strips 12 and 13 wound thereon in the manner previously described. When the particular telescoped core 11 is removed from the chute means 58 by the mandrel means 23, the next core 11 falls against the bottom wall 61 to be subsequently telescoped by another mandrel means 23 in the manner previously described.

Thus, it can be seen that the hopper means 21 is adapted to supply cores 11 to the dispensing opening 60 of the chute 58 in a fully oriented condition even though the same are merely dumped at random in the upper end of the receptacle means 43, the rotating sleeve 51 fully converting the cores 11 from their unoriented condition to a fully oriented condition for the chute means 58.

It may be found that it is desirable to more positively hold each core 11 against the bottom wall 61 of the chute means 58 during the operation of the apparatus 19. While any suitable means could be provided for such function, it has been found that the bottom wall 61 can have a passage means 86 therein adapted to be covered by a core 11 when the core 11 is disposed against the wall 61 whereby a suitable vacuum line 87 can be interconnected to the passage means 86. In this manner, each core 11 is held in a positive position against the wall 61 by the vacuum means as each core 11 reaches the wall 61 in the manner previously described.

While the speed of filling the chute means 58 with aligned cores 11 can be regulated by either changing the inclination of the receptacle means 43 or the inclination of the sleeve 51 or by either changing the speed of vibration of the hopper means 43 or the speed of rotation of the sleeve 51 so that the hopper means 21 will always have a core 11 at the dispensing opening 60 when a mandrel 23 is extending into the opening 60, the hopper means 21 can be so constructed and arranged that the same will prevent an over filling thereof.

In particular, the baffle means 49 at the opening 46 of the receptacle means 43 are so constructed and arranged that should the chute means 58 and rotating sleeve 51 be filled with cores 11, the baffle means 49 will eject each core 11 falling through the opening 46 out to the right so that the same will fall into a suitable container (not shown) for such purpose. However, as the sleeve 51 begins to empty, the baffle means 49 will then direct the cores 11 from the receptacle means 43 into the end 50 thereof.

In addition to the operation of the baffle means 49 previously described or in lieu thereof, as desired, certain sensing means can be provided to automatically turn off the motor 56 when the chute means 58 is filled above a desired level with the aligned cores 11 and to automatically turn on the motor 56 when the cores 11 in the chute means 58 fall below that level whereby the stopping of the rotation of the sleeve 51 will stop the feeding of cores 11 into the open end 59 of the chute means 58.

Figure 6:
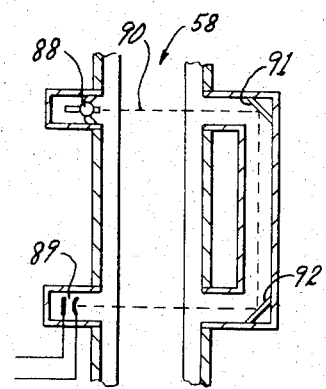
FIGURE 6 is an enlarged, fragmentary, cross-sectional view taken on line 6—6 of FIGURE 4.

For example, see FIGURES 4 and 6 wherein one side of the chute 58 carries a light source 88 and a photocell 89 whereby the beam 90 of light from the source 88 will tend to cross the chute 58, be reflected downwardly by a mirror 91 and be reflected back across the chute 58 by another mirror 92 to be directed to the photocell 89. Thus, as long as the photocell 89 receives the beam 90, the photocell 89 continues to cause operation of the motor 56 so that the sleeve 51 will be rotated to dispense oriented cores 11 into the chute 58. However, if the supply of the cores 11 in the chute 58 builds up to a point wherein the cores 11 in the chute 58 prevent the light beam 90 from reaching the photocell 89, the photocell 89 will turn off the motor 56 to prevent further dispensing of the cores 11 into the chute 58 until the level of cores 11 in the chute 58 falls below the level which prevents the light source 88 from directing the beam 90 to the photocell 89.

Thus, it can be seen that various means can be provided for automatically controlling the operation of the hopper means 21 to prevent an over supply of cores 11 in the chute means 58, if desired.

While the speed of operation of the hopper means 21 can vary, as desired, it has been found that the particular apparatus 19 of this invention operates in such a manner that a capacity of six to nine cores 11 in the chute 58 will be the equivalent of approximately two to three minutes operation of the apparatus 19 so that should a defective core 11 be in the hopper means 21 thereof and cause a jam therein, sufficient time is provided for the operator to clear the jam before the supply of aligned cores in the chute means 58 is exhausted. For such a feeding speed for the hopper means 21, it has been found that the average speed of rotation of the sleeve 51 can be approximately 200 revolutions per minute with the angle of the sleeve 51 relative to the horizontal being about 6 to 10 degrees.

If desired, a trouble light can be provided for the apparatus 19 of this invention so that the light would be energized in case of a stoppage of the system for a run out of cores 11. Alternatively, a buzzer could sound at such time whereby such warning devices would alert the operator to the adverse condition.

Thus, it can be seen that the rotating sleeve 51 and prong 62 permit a hopper means 21 that can handle a wide range of core sizes 11 regardless of the diameters and lengths thereof because the rotating sleeve 51 will orient very small cores 11 as well as cores 11 having an outside diameter almost equal to the inside diameter of the rotating sleeve 51.

In addition, the hopper means 21 is so constructed and arranged that a minimum of effort is needed to adjust the hopper means 21 to different sizes of cores 11.

Therefore, it can be seen that this invention not only provides an improved work piece feeding mechanism or the like but also this invention provides an improved method of feeding work pieces or the like.

While the form of the invention now preferred has been disclosed as required by a statutes, other forms may be used, al coming within the scope of the claims which follow.

What is claimed is:

1. A strip conductor coil winding apparatus having mandrel means for indexing cores through various stations of said apparatus, receptacle means carried by said apparatus for containing a supply of hollow cylindrical cores, chute means carried by said apparatus for serially dispensing said cores to a discharge opening thereof where said mandrel means can be extended into said opening to telescope into a core at said opening and, thereafter, be retracted to remove said telescoped core from said chute means, and a rotating sleeve for serially receiving said cores in unoriented condition at one end thereof from said receptacle means and aligning said cores in said chute means in oriented position at the other end thereof, said rotating sleeve orienting said cores as they pass therethrough by aligning the axis of each core with the longitudinal axis of said sleeve.

2. A strip conductor coil winding apparatus as set forth in claim 1, said chute means having means to positively hold each core at said opening thereof.

3. A strip conductor coil winding apparatus as set forth in claim 2, said holding means comprising vacuum means.

4. A strip conductor coil winding apparatus as set forth in claim 1, said chute means having a movable backup member disposed behind said opening, and spring means urging said backup member to one position thereof so that as said mandrel means is extended into said opening and tends to push said core at said opening rearwardly, said backup member moves therewith in opposition to said spring means and forces said core onto said mandrel means by the force of said spring means.

5. A strip conductor coil winding apparatus as set forth in claim 1, means for preventing an over supply of cores in said chute means.

6. A strip conductor coil winding apparatus as set forth in claim 1, said sleeve being disposed at an angle relative to the horizontal with said one end of said sleeve disposed higher than said other end thereof, said chute means being substantially vertical.

7. Hopper means for feeding members comprising receptacle means for containing a supply of said members, said receptacle means having an outlet means for dispensing said members therefrom, chute means for serially dispensing said members, a rotating sleeve for serially receiving said members in unoriented condition at one end thereof from said outlet means of said receptacle means and aligning said members in said chute means in an oriented condition at the other end thereof, said rotating sleeve orienting said members as they pass therethrough, and means carried by said hopper means for serially directing said members into said one end of said sleeve as said members are dispensed from said outlet means of said receptacle means, said chute means being substantially vertical, said hopper means carrying an element for tilting said oriented members into said chute means as said members leave said other end of said sleeve.

8. Hopper means for feeding members comprising receptacle means for containing a supply of said members, said receptacle means having an outlet means for dispensing said members therefrom, chute means for serially dispensing said member, a rotating sleeve for serially receiving said members in unoriented condition at one end thereof from said outlet means of said receptacle means and aligning said members in said chute means in an oriented condition at the other end thereof, said rotating sleeve orienting said members as they pass therethrough, and means carried by said hopper means for serially directing said members into said one end of said sleeve as said members are dispensed from said outlet means of said receptacle means, said last-named means directing said members in a path away from said one end of said sleeve when said chute means and said sleeve are filled with members.

References Cited

UNITED STATES PATENTS

| | | | |
|---|---|---|---|
| 1,394,908 | 10/1921 | Kelling | 198—34 |
| 1,702,901 | 2/1929 | Hungerford | 221—172 X |
| 2,571,576 | 10/1951 | Hopkins et al. | 221—175 |
| 2,668,675 | 2/1954 | Wolfe | 242—56 |
| 2,696,285 | 12/1954 | Zenlea | 221—156 X |
| 2,786,566 | 3/1957 | Taggart et al. | 221—178 X |
| 3,148,782 | 9/1964 | Eburn et al. | 221—210 X |
| 3,199,652 | 8/1965 | Kilner et al. | 198—34 |

WALTER SOBIN, *Primary Examiner.*